US011356705B2

(12) United States Patent
Coban et al.

(10) Patent No.: US 11,356,705 B2
(45) Date of Patent: Jun. 7, 2022

(54) PICTURE HEADER INTRA RANDOM ACCESS PICTURE AND GRADUAL DECODER REFRESH SIGNALING IN VIDEO CODING

(71) Applicant: QUALCOMM Incorporated, San Diego, CA (US)

(72) Inventors: Muhammed Zeyd Coban, Carlsbad, CA (US); Vadim Seregin, San Diego, CA (US); Adarsh Krishnan Ramasubramonian, Irvine, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 17/130,759

(22) Filed: Dec. 22, 2020

(65) Prior Publication Data
US 2021/0195248 A1    Jun. 24, 2021

Related U.S. Application Data

(60) Provisional application No. 62/953,035, filed on Dec. 23, 2019.

(51) Int. Cl.
| | |
|---|---|
| *H04B 1/66* | (2006.01) |
| *H04N 7/12* | (2006.01) |
| *H04N 11/02* | (2006.01) |
| *H04N 11/04* | (2006.01) |
| *H04N 19/70* | (2014.01) |
| *H04N 19/172* | (2014.01) |
| *H04N 19/174* | (2014.01) |

(Continued)

(52) U.S. Cl.
CPC ........... *H04N 19/70* (2014.11); *H04N 19/172* (2014.11); *H04N 19/174* (2014.11); *H04N 19/184* (2014.11); *H04N 19/188* (2014.11)

(58) Field of Classification Search
CPC ............................. H04N 19/174; H04N 19/70
See application file for complete search history.

(56) References Cited

U.S. PATENT DOCUMENTS

| | | | | |
|---|---|---|---|---|
| 2021/0092448 A1* | 3/2021 | Choi | ..................... | H04N 19/105 |
| 2021/0314582 A1* | 10/2021 | Choi | ..................... | H04N 19/46 |

OTHER PUBLICATIONS

Bross et al. "Versatile Video Coding (Draft 7)", JVET-P2001, Joint Video Exploration Team (JVET) of ITU-T SG 16 WP 3 and ISO/IEC JTC 1/SC 29/WG 11, 16th Meeting: Geneva, CH, Oct. 1-11, 2019.*

(Continued)

*Primary Examiner* — Fabio S Lima
(74) *Attorney, Agent, or Firm* — Shumaker & Sieffert, P.A.

(57) ABSTRACT

A method of processing video data comprises obtaining a bitstream and locating intra random access pictures (IRAP) or Gradual Decoder Refresh (GDR) pictures among the encoded pictures in the bitstream. Locating the IRAP or GDR pictures may comprise obtaining, from a picture header Network Abstraction Layer (NAL) unit in the bitstream, a syntax element that indicates that a picture associated with the picture header NAL unit must be either an Intra Random Access Picture (IRAP) or a Gradual Decoder Refresh (GDR) picture. The picture header NAL unit contains syntax elements that apply to all slices of the picture associated with the picture header NAL unit.

20 Claims, 6 Drawing Sheets

(51) Int. Cl.
   *H04N 19/169* (2014.01)
   *H04N 19/184* (2014.01)

(56) References Cited

OTHER PUBLICATIONS

Bross B., et al., "Versatile Video Coding (Draft 7)", 16th JVET Meeting, Oct. 1, 2019-Oct. 11, 2019, Geneva, (The Joint Video Exploration Team of ISO/IEC JTC1/SC29/WG11 and ITU-T SG. 16 WP 3), No. JVET-P2001-vE, Nov. 12, 2019 (Nov. 12, 2019), XP030224328, 494 pages, Retrieved from the Internet: URL: http://phenix.int-evry.fr/jvet/doc_end_user/documents/16_Geneva/wg11/JVET-P2001-v14.zip JVET-P2001-vC.docx , [retrieved on Nov. 12, 2019], paragraphs [9.3.3.2], [9.3.3.6], [9.3.3.14], table 124.

Coban (Qualcomm) M, et al., "AHG9: On Picture Header IRAP/GDR Signalling", 17. JVET Meeting; Jan. 7, 2020-Jan. 17, 2020; Brussels; (The Joint Video Exploration Team of ISO/IEC JTC1/SC29/WG11 and ITU-T SG.16), No. JVET-Q0154, Dec. 28, 2019 (Dec. 28, 2019), XP030222719, 5 pages, Retrieved from the Internet: URL: http://phenix.int-evry.fr/jvet/doc_end_user/documents/17_Brussels/wg11/JVET-Q0154-v1.zip JVET-Q0154.docx [retrieved on Dec. 28, 2019] the whole document.

International Search Report and Written Opinion—PCT/US2020/066838—ISA/EPO—Feb. 8, 2021, 14 pp.

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Nishi (Panasonic) T, et al., "AHG9: Unified Signalling of PTL and HRD Parameters in VPS", 17, JVET Meeting Jan. 7 2020-Jan. 17, 2020; Brussels; (The Joint Video Exploration Team of ISO/IEC JTC1/SC29/WG11 and ITU-T SG.16), No. JVET-Q0047, Dec. 18, 2019 (Dec. 18, 2019), XP030222423, 4 pages, Retrieved from the Internet: URL: http://phenix.int-evry.fr/jvet/doc_end_user/documents/17_Brussels/wg11/JVET-Q0047-v1 .zip JVET-30047 based on JVET-P2001-vE.docx [retrieved-on Dec. 18, 2019] paragraphs [7.3.6.2], [7.4.3.6]; table 5.

Ryu (Samsung) G, et al., "Simplified NAL Unit Header and IRAP Pictures for Random Access", 12. JVET Meeting, Oct. 3, 2018-Oct. 12, 2018; Macao, (The Joint Video Exploration Team of ISO/IEC JTC1/SC29/WG11 and ITU-T SG.16) No. JVET-L0064, Oct. 10, 2018 (Oct. 10, 2018), XP030195329, 2 pages, Retrieved from the Internet: URL http://phenix.int-evry.fr/jvet/doc_end_user/documents/12_Macao/wg11/JVET-L0064-v5.zip JVET-L0064_r4.docx [retrieved on Oct. 10, 2018] the whole document.

\* cited by examiner

PICTURE HEADER INTRA RANDOM ACCESS PICTURE AND GRADUAL DECODER REFRESH SIGNALING IN VIDEO CODING

This application claims the benefit of U.S. Provisional Patent Application 62/953,035, filed Dec. 23, 2019, the entire content of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques related to techniques for signaling Intra Random Access Pictures (IRAP) or gradual decoding refresh (GDR) pictures in video coding. For instance, this disclosure describes techniques in which a video encoder may signal a syntax element in a picture header Network Abstraction Layer (NAL) unit. The syntax element that indicates that a picture associated with the picture header must be a IRAP or GDR picture. This syntax element may enable a device, such as a device that includes a video decoder, to locate the picture header associated with a IRAP or GDR picture without searching back in a NAL unit stream for the picture header NAL unit.

In one example, this disclosure describes a method of processing video data, the method comprising: obtaining a bitstream that comprises a set of encoded pictures of the video data; and locating intra random access pictures (IRAP) or Gradual Decoder Refresh (GDR) pictures among the encoded pictures in the bitstream, wherein locating the IRAP or GDR pictures comprises: obtaining, from a picture header Network Abstraction Layer (NAL) unit in the bitstream, a syntax element that indicates that a picture associated with the picture header NAL unit must be either an Intra Random Access Picture (IRAP) or a Gradual Decoder Refresh (GDR) picture; and determining, based on the syntax element, that the picture associated with the picture header NAL unit is an IRAP or a GDR picture, wherein: the picture header NAL unit contains syntax elements that apply to all slices of the picture associated with the picture header NAL unit, and the picture associated with the picture header NAL unit is in the set of encoded pictures.

In another example, this disclosure describes a method of encoding video data, the method comprising: generating encoded pictures for a set of pictures of the video data; and including a picture header Network Abstraction Layer (NAL) unit in a bitstream that comprises the encoded pictures, wherein the picture header NAL unit includes a syntax element that indicates that a picture associated with the picture header NAL unit must be either an Intra Random Access Picture (IRAP) or a Gradual Decoder Refresh (GDR) picture, wherein: the picture header NAL unit contains syntax elements that apply to all slices of the picture associated with the picture header NAL unit, and the picture associated with the picture header NAL unit is in the set of encoded pictures.

In another example, this disclosure describes a device for processing video data, the device comprising: a memory configured to store encoded pictures of the video data; and one or more processors implemented in circuitry, the one or more processors configured to: locate intra random access pictures (IRAP) or Gradual Decoder Refresh (GDR) pictures among the encoded pictures in the bitstream, wherein the one or more processors are configured such that, as part of locating the IRAP or GDR pictures, the one or more processors: obtain, from a picture header Network Abstraction Layer (NAL) unit in the bitstream, a syntax element that indicates that a picture associated with the picture header NAL unit must be either an Intra Random Access Picture (IRAP) or a Gradual Decoder Refresh (GDR) picture; and determine, based on the syntax element, that the picture associated with the picture header NAL unit is an IRAP or a GDR picture, wherein: the picture header NAL unit contains syntax elements that apply to all slices of the picture associated with the picture header NAL unit, and the picture associated with the picture header NAL unit is in the set of encoded pictures.

In another example, this disclosure describes a device for encoding video data, the device comprising: a memory configured to store the video data; and one or more processors implemented in circuitry, the one or more processors configured to: generate encoded pictures for a set of pictures of the video data; and include a picture header Network Abstraction Layer (NAL) unit in a bitstream that comprises the encoded pictures, wherein the picture header NAL unit includes a syntax element that indicates that a picture associated with the picture header NAL unit must be either an Intra Random Access Picture (IRAP) or a Gradual Decoder Refresh (GDR) picture, wherein: the picture header NAL unit contains syntax elements that apply to all slices of the picture associated with the picture header NAL unit, and the picture associated with the picture header NAL unit is in the set of encoded pictures.

In another example, this disclosure describes a device for processing video data, the device comprising: means for a bitstream that comprises a set of encoded pictures of the video data; and means for locating intra random access pictures (IRAP) or Gradual Decoder Refresh (GDR) pictures among the encoded pictures in the bitstream, wherein the means for locating the IRAP or GDR pictures comprises: means for obtaining, from a picture header Network Abstraction Layer (NAL) unit in the bitstream, a syntax element that indicates that a picture associated with the picture header NAL unit must be either an Intra Random Access Picture (IRAP) or a Gradual Decoder Refresh (GDR) picture; and means for determining, based on the syntax element, that the picture associated with the picture header NAL unit is an IRAP or a GDR picture, wherein: the picture header NAL unit contains syntax elements that apply to all slices of the picture associated with the picture header NAL unit, and the picture associated with the picture header NAL unit is in the set of encoded pictures.

In another example, this disclosure describes a device for encoding video data, the device comprising: means for generating encoded pictures for a set of pictures of the video data; and means for including a picture header Network Abstraction Layer (NAL) unit in a bitstream that comprises the encoded pictures, wherein the picture header NAL unit includes a syntax element that indicates that a picture associated with the picture header NAL unit must be either an Intra Random Access Picture (IRAP) or a Gradual Decoder Refresh (GDR) picture, wherein: the picture header NAL unit contains syntax elements that apply to all slices of the picture associated with the picture header NAL unit, and the picture associated with the picture header NAL unit is in the set of encoded pictures.

In another example, this disclosure describes a computer-readable storage medium having stored thereon instructions that, when executed, cause one or more processors to: obtain a bitstream that comprises a set of encoded pictures of the video data; and locate intra random access pictures (IRAP) or Gradual Decoder Refresh (GDR) pictures among the encoded pictures in the bitstream, wherein the instructions that cause the one or more processors to locate the IRAP or GDR pictures comprise instructions that, when executed, cause the one or more processors to: obtain, from a picture header Network Abstraction Layer (NAL) unit in the bitstream, a syntax element that indicates that a picture associated with the picture header NAL unit must be either an Intra Random Access Picture (IRAP) or a Gradual Decoder Refresh (GDR) picture; and determine, based on the syntax element, that the picture associated with the picture header NAL unit is an IRAP or a GDR picture, wherein: the picture header NAL unit contains syntax elements that apply to all slices of the picture associated with the picture header NAL unit, and the picture associated with the picture header NAL unit is in the set of encoded pictures.

In another example, this disclosure describes a computer-readable storage medium having stored thereon instructions that, when executed, cause one or more processors to: generate encoded pictures for a set of pictures of the video data; and include a picture header Network Abstraction Layer (NAL) unit in a bitstream that comprises the encoded pictures, wherein the picture header NAL unit includes a syntax element that indicates that a picture associated with the picture header NAL unit must be either an Intra Random Access Picture (IRAP) or a Gradual Decoder Refresh (GDR) picture, wherein: the picture header NAL unit contains syntax elements that apply to all slices of the picture associated with the picture header NAL unit, and the picture associated with the picture header NAL unit is in the set of encoded pictures.

The details of one or more examples are set forth in the accompanying drawings and the description below. Other features, objects, and advantages will be apparent from the description, drawings, and claims.

DETAILED DESCRIPTION

The ability to start playback of a video at random points within a video is an important feature of modern video coding. In Versatile Video Coding (VVC) and other video coding standards, random access may be achieved by encoding specific types of pictures as Intra Random Access Pictures (IRAPs) or Gradual Decoder Refresh (GDR) pictures. In VVC, IRAPs and GDR pictures can be identified based on the network abstraction layer (NAL) unit types of NAL units that contain encoded slices of IRAPs and GDR pictures. Furthermore, in VVC, pictures are associated with picture header NAL units that are signaled before the NAL units that contain encoded slices of the pictures in bitstream order. Thus, when performing random access, a device (e.g., a video decoder) may identify NAL units whose NAL unit types indicate that the encoded slices contained therein belong to IRAPs or GDR pictures. The device must then search backward in bitstream order to find the picture header so that the device can decode the IRAP or GDR picture, or forward to picture header onward for later decoding.

Searching backward in this manner may slow down the process of performing random access. This disclosure describes techniques that may address this problem. In one example, a video encoder may generate encoded pictures for a set of pictures of the video data. In this example, the video encoder may include a picture header NAL unit in a bitstream that comprises the encoded pictures. The picture header NAL unit includes a syntax element that indicates that a picture associated with the picture header NAL unit must be either an IRAP or a Gradual Decoder Refresh (GDR) picture. Because of this syntax element, a device performing random access may directly identify the picture header NAL unit as being associated with an IRAP or GDR picture without needing to search backward in the bitstream to find this picture header NAL unit.

Figure 1:
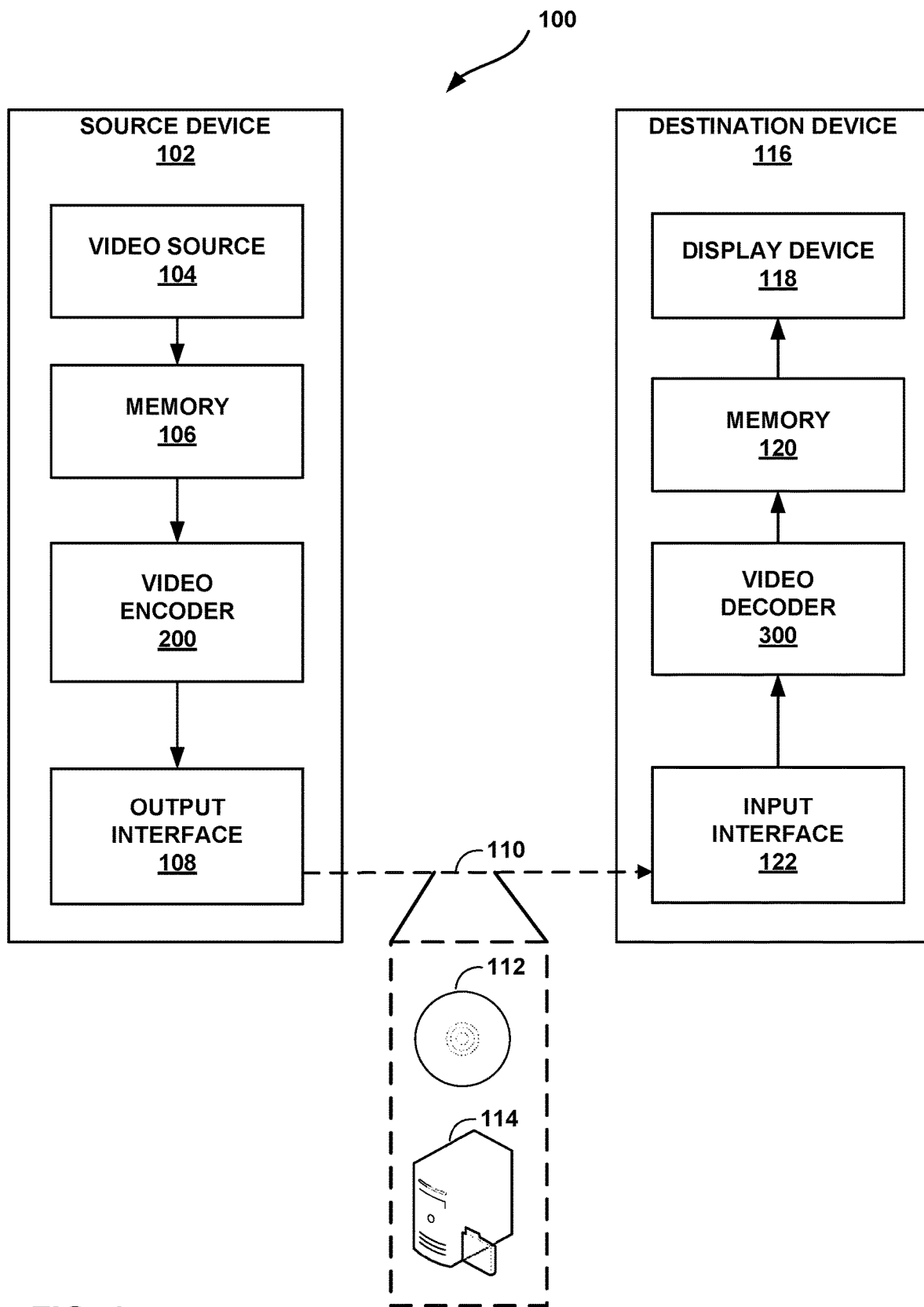
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques related to techniques for signaling Intra Random Access Pictures (IRAP) or gradual decoding refresh (GDR) pictures in video coding. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques related to techniques for signaling IRAP or GDR pictures in video coding. Source device 102 and destination device 116 are merely examples of such coding devices in which source device 102 generates encoded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, computer-readable medium 110 may include storage device 112. Source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, computer-readable medium 110 may include file server 114 or another intermediate storage device that may store the encoded video data generated by source device 102. Source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A recent draft of the VVC standard is described in Bross, et al. "Versatile Video Coding (Draft 7)," Joint Video Experts Team (JVET) of ITU-T SG 16 WP 3 and ISO/IEC JTC 1/SC 29/WG 11, 16$^{th}$ Meeting: Geneva, CH, 1-11 Oct. 2019, JVET-P2001-v14 (hereinafter "VVC Draft 7"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data. A picture header is a syntax structure containing syntax elements that apply to all slices of a coded picture.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

A bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and may encapsulate a RBSP. The NAL unit header may include a syntax element indicating a NAL unit type code. The NAL unit type code specified by the NAL unit header of a NAL unit indicates the type of the NAL unit. An RBSP may be a syntax structure containing an integer number of bytes that is encapsulated within a NAL unit. In some instances, an RBSP includes zero bits.

In HEVC, VVC, and other video coding specifications, each NAL unit includes a syntax element (e.g., nal_unit_type) that indicates a NAL unit type of the NAL unit. Furthermore, video decoder 300 may identify, based on the NAL unit type of a NAL unit, the NAL unit as being associated with one of a plurality of picture types. These picture types may include Instantaneous Decoding Refresh (IDR) pictures, Clean Random Access (CRA) pictures, Temporal Sub-Layer Access (TSA) pictures, Broken Link Access (BLA) pictures and encoded pictures that are not IDR, CRA, or TSA pictures.

Ideally, channel switching and jumping in this manner should be performed with a minimum amount of delay. HEVC, VVC, and other video coding specifications provide mechanisms for enabling random access into bitstreams. Random access refers to a decoding of a bitstream starting from an encoded picture that is not the first encoded picture in the bitstream. Random access to a bitstream may be needed in various video applications, such as broadcasting and streaming. Random access to a bitstream may enable users to tune in to a program at any time, to switch between different channels, to jump to specific parts of a video, or to switch to a different bitstream for stream adaptation (e.g., adaption of a bit rate, adaptation of a frame rate, adaptation of a spatial resolution, etc.). Channel switching and jumping may be enabled by including random access pictures at regular intervals in video bitstreams. The insertion of intra random access point (IRAP) pictures into a bitstream at regular intervals may enable random access. Example types of IRAP pictures include IDR pictures, CRA pictures, and BLA pictures. Hence, IDR pictures, CRA pictures and BLA pictures are collectively referred to as IRAP pictures. An access unit that contains an IRAP picture in a base layer may be referred to herein as an IRAP access unit.

Provided the necessary parameter sets are available when they need to be activated, the IRAP picture and all subsequent non-Random Access Skipped Leading (RASL) pictures in decoding order can be correctly decoded without performing the decoding process of any pictures that precede the IRAP picture in decoding order. There may be pictures in a bitstream that contain only I slices (i.e., slices in which a video coder may use intra prediction, but not inter prediction) that are not IRAP pictures.

An DR picture contains only I slices. An IDR picture may be the first picture in the bitstream in decoding order, or may appear later in the bitstream. Each DR picture is the first picture of an encoded video sequence in decoding order. Pictures following an IDR picture in decoding order cannot use pictures decoded prior to the IDR picture as reference. Accordingly, bitstreams relying on IDR pictures for random access can have significantly lower coding efficiency than bitstreams that use additional types of random access pictures. An IDR access unit is an access unit that contains an IDR picture.

An IDR picture may cause a decoding process to mark all reference pictures as "unused for reference." Because reference pictures marked as "unused for reference" may be removed from a decoded picture buffer (DPB) that stores the reference pictures, an IDR picture may "clean out" the DPB. All encoded pictures that follow an IDR picture in decoding order can be decoded without inter prediction from any picture that precedes the IDR picture in decoding order. The first picture of each encoded video sequence in decoding order is an IDR picture or a BLA picture, or a CRA picture that is also the first picture of the bitstream. When an encoded picture in a base layer of an access unit is an IDR picture, the access unit may be referred to as an IDR access unit. In some examples, a coded video sequence is a sequence of access units that includes or consists, in decoding order, of an IDR access unit followed by zero or more access units that are not IRAP access units with NoRaslOutputFlag equal to 1 including all subsequent access units up to but not including any subsequent IDR access unit.

However, because an IDR picture starts a coded video sequence and may always clean the DPB, pictures following the IDR picture in decoding order cannot use pictures decoded prior to, in decoding order, the IDR picture for reference. To improve the coding efficiency, a CRA picture may allow pictures that follow the CRA picture in decoding order, but precede the CRA picture in output order, to use pictures decoded before the CRA for reference.

The CRA picture type facilitates decoding that begins from any random access point (RAP) in the middle of a video sequence. Inserting CRA pictures in a video sequence may be more efficient than inserting IDR pictures into the same video sequence. In HEVC and potentially other video coding specifications, a bitstream starting from a CRA picture may be a conforming bitstream.

CRA pictures allow pictures that follow a CRA picture in decoding order, but precede the CRA picture in output order, to use pictures decoded before the CRA picture for reference. Pictures that follow a CRA picture in decoding order, but precede the CRA picture in output order, are referred to as leading pictures associated with the CRA picture (or leading pictures of the CRA picture). A CRA access unit is an access unit in which the encoded picture of a base layer is a CRA picture.

The leading pictures of a CRA picture may be correctly decodable if decoding starts from an IDR picture or a CRA picture occurring before the CRA picture in decoding order. However, the leading pictures of a CRA picture may be non-decodable when random access from the CRA picture occurs. Hence, a video decoder typically decodes the leading pictures of a CRA picture during random access decoding. To prevent error propagation from reference pictures that may not be available depending on where the decoding starts, no picture that follows a CRA picture both in decoding order and output order may use any picture that precedes the CRA picture either in decoding order or output order (which includes the leading pictures) as reference.

A BLA picture typically originates from bitstream splicing at the position of a CRA picture, and in the spliced bitstream the splicing point CRA picture is changed to a BLA picture. A BLA access unit is an access unit that contains a BLA picture in a base layer. One difference between BLA pictures and CRA pictures is as follows. For a CRA picture, the associated leading pictures are correctly decodable if the decoding starts from a RAP picture before the CRA picture in decoding order. However, the leading pictures associated with a CRA picture may not be correctly decodable when random access from the CRA picture occurs (i.e., when decoding starts from the CRA picture, or in other words, when the CRA picture is the first picture in the bitstream). In contrast, there may be no scenario where the leading pictures associated with a BLA picture are decodable, even when decoding starts from a RAP picture before the BLA picture in decoding order.

Some of the leading pictures associated with a particular CRA picture or a particular BLA picture may be correctly decodable even when the particular CRA picture or the particular BLA picture is the first picture in a bitstream.

These leading pictures may be referred to as decodable leading pictures (DLPs). Other leading pictures may be referred to as non-decodable leading pictures (NLPs). NLPs may also be referred to as tagged for discard (TFD) pictures.

GDR may enable a device to code a set of pictures, such as a sequence or series of pictures arranged in decoding order. Such a sequence of pictures is referred to herein as a "GDR picture set" or a "GDR set." Upon traversing the entire GDR set (e.g., upon reaching the end of the GDR set), the video coding device may randomly access one or more encoded pictures that follow the set, in decoding order. In various examples, the video coding device may correctly or accurately decode the entirety of the last picture of the GDR set. In such examples, the first picture of the GDR set may represent a "GDR picture" and the last picture in the GDR set may represent a "recovery point picture." A recovery point picture may, in turn, represent a picture in which the entire picture is included in a "refreshed" or "foreground" region. Hence, the picture is gradually refreshed over a series of pictures in the GDR set until, at the recovery point picture, the picture is completely refreshed. The video coding device may determine the bounds of the GDR set, as well as other information pertaining to the GDR set, using particular SEI messages, such as a "recovery point" SEI message and/or a "region refresh information" SEI message.

In VVC Draft 7, slice NAL units have NAL unit types (NUTS) indicating IDR_W_RADL, IDR_N_LP, CRA_NUT, GDR_NUT, which correspond to IRAP or GDR picture slice data. Slice NAL units with NAL unit types of IDR_W_RADL are associated with IDR pictures with random access decodable leading pictures. Slice NAL units with NAL unit types of IDR_N_LP are associated with IDR pictures with no leading pictures. Slice NAL units with NAL unit types of CRA_NUT are associated with CRA pictures. Slice NAL units with NAL unit types of GDR_NUT are associated with GDR pictures. The slice data is preceded by a NAL unit having a picture header NAL unit type (NUT) (PH_NUT). In VVC Draft 7, in order to locate an IRAP or GDR picture in a bitstream, a device would need to first locate a slice having a IDR_W_RADL, IDR_N_LP, CRA_NUT, or GDR_NUT NAL unit type and then go back and locate a picture header associated with the slice. It may be desirable to locate the random access picture or GDR picture directly by signaling the random access picture or GDR picture in a picture header in order to accelerate the process of locating random access pictures and GDR pictures.

In accordance with a technique of this disclosure, a field or flag indicating an IRAP (or types of IRAP) or a GDR picture is indicated at or near the start of a picture header. The corresponding PH_NUT along with this flag would make the detection of IRAP and GDR pictures simpler. Examples below show two solutions: a first technique based on signaling a flag (e.g., irap_or_gdr_pic_flag), and a second technique that includes signaling a field (e.g., irap_gdr_idc) that signals specific types of IRAP or GDR pictures.

In accordance with the first technique of this disclosure, a picture header RBSP includes a flag (e.g., irap_or_gdr_pic_flag) that may indicate that pictures associated with the picture header RBSP must be either IRAPs or GDR pictures. In the following text and throughout this disclosure, changes to text in VVC Draft 7 are marked with <!> . . . </!> tags. Deletions of text from VVC Draft 7 are marked with <dlt> . . . </dlt> tags.

VVC Draft 7 Changes BEGIN 7.3.2.6 Picture Header RBSP Syntax

|  | Descriptor |
|---|---|
| picture_header_rbsp( ) { |  |
|   <!>irap_or_gdr_pic_flag</!> | u(1) |
|   non_reference_picture_flag | u(1) |
|   <!>if( irap_or_gdr_pic flag )</!> |  |
|     gdr_pic_flag | u(1) |
|   no_output_of_prior_pics_flag | u(1) |
|   if( gdr_pic_flag ) |  |
|     recovery_poc_cnt | ue(v) |
|   ph_pic_parameter_set_id | ue(v) |
|   ... |  |

7.4.3.6 Picture Header RBSP Semantics

The PH contains information that is common for all slices of the coded picture associated with the PH.

<!>irap_or_gdr_pic_flag equal to 1 specifies the picture associated with the PH is an IRAP or GDR. irap_or_gdrpic_flag equal to 0 specifies the picture associated with the PH is neither IRAP nor GDR picture.</!> non_reference_picture_flag equal to 1 specifies the picture associated with the PH is never used as a reference picture. non_reference_picture_flag equal to 0 specifies the picture associated with the PH may or may not be used as a reference picture.

gdr_pic_flag equal to 1 specifies the picture associated with the PH is a GDR picture. gdr_pic_flag equal to 0 specifies that the picture associated with the PH is not a GDR picture. <!>When not present, it is inferred to be equal to 0.</!>

VVC Draft 7 Changes END

Thus, in accordance with the first technique of this disclosure, video encoder 200 may generate encoded pictures for a set of pictures of the video data. Additionally, video encoder 200 may include a picture header NAL unit in a bitstream that comprises the encoded pictures. In some examples, the picture header NAL unit includes a first syntax element (e.g., irap_or_gdr_pic_flag) that indicates whether a picture associated with the picture header NAL unit is an IRAP or a GDR picture. In some examples, the first syntax element indicates that the picture associated with the picture header NAL unit is neither an IRAP or a GDR picture. In some examples, the first syntax element indicates that the picture associated with the picture header NAL unit is not an IRAP but may be a GDR picture. In some examples, the first syntax element indicates that the picture associated with the picture header NAL unit may or may not be an IRAP but may not be a GDR picture. The picture header NAL unit contains syntax elements that apply to all slices of the picture associated with the picture header NAL unit. The picture associated with the picture header NAL unit is in the set of encoded pictures. A picture may be associated with a picture header NAL unit if the picture header NAL unit is a picture header NAL unit that precedes a first encoded slice NAL unit of the picture.

Similarly, in some examples, video decoder 300 or another device (e.g., an intermediate network device, etc.) may obtain a bitstream that comprises a set of encoded pictures of the video data; and locate IRAP or GDR pictures among the encoded pictures in the bitstream, wherein locating the IRAP or GDR pictures comprises: obtaining, from a picture header NAL unit in the bitstream, a first syntax element (e.g., irap_or_gdr_pic_flag) that indicates that a picture associated with the picture header NAL unit is an IRAP or a GDR picture. In some examples, the first syntax element indicates that the picture associated with the picture header NAL unit is not an IRAP but may be a GDR picture. In some examples, the first syntax element indicates that the picture associated with the picture header NAL unit may or may not be an IRAP but may not be a GDR picture. The picture header NAL unit may contain syntax elements that apply to all slices of the picture associated with the picture header NAL unit. The picture associated with the picture header NAL unit is in the set of encoded pictures.

In accordance with a second technique of this disclosure, a field indicating IDR, CRA, GDR types is included in the picture header. For instance, in the example shown below, a 2-bit field (e.g., irap_gdr_idc) is added to a picture header RBSP, as shown below:

VVC Draft 7 Changes BEGIN 7.3.2.6 Picture Header RBSP Syntax

| | Descriptor |
|---|---|
| picture_header_rbsp( ) { | |
| <!> irap_gdr_idc</!> | u(2) |
| non_reference_picture_flag | u(1) |
| </dlt>gdr_pic_flag</dlt> | <dlt>u(1)</dlt> |
| no_output_of_prior_pics_flag | u(1) |
| <dlt> if( gdr_pic_flag )</dlt> | |
| <!> if(irap_gdr_idc = = 3)</!> | |
| recovery_poc_cnt | ue(v) |
| ph_pic_parameter_set_id | ue(v) |
| ... | |

7.4.3.6 Picture Header RBSP Semantics
The PH contains information that is common for all slices of the coded picture associated with the PH.
<!>irap_gdr_idc equal to 0 indicates a picture that is not IRAP or GDR. irap_gdr_pic_idc equal to 1 indicates IDR picture, irap_gdr_idc equal to 2 indicates CRA picture. irap_gdr_idc equal to 3 indicates GDR picture.</!>
non_reference_picture_flag equal to 1 specifies the picture associated with the PH is never used as a reference picture. non_reference_picture_flag equal to 0 specifies the picture associated with the PH may or may not be used as a reference picture.
<dlt>gdr_pic_flag equal to 1 specifies the picture associated with the PH is a GDR picture. gdr_pic_flag equal to 0 specifies that the picture associated with the PH is not a GDR picture.</dlt>
recovery_poc_cnt specifies the recovery point of decoded pictures in output order. If the current picture is a GDR picture that is associated with the PH and there is a picture picA that follows the current GDR picture in decoding order in the CLVS and that has PicOrderCntVal equal to the PicOrderCntVal of the current GDR picture plus the value of recovery_poc_cnt, the picture picA is referred to as the recovery point picture. Otherwise, the first picture in output order that has PicOrderCntVal greater than the PicOrderCntVal of the current picture plus the value of recovery_po-c_cnt is referred to as the recovery point picture. The recovery point picture shall not precede the current GDR picture in decoding order. The value of recovery_poc_cnt shall be in the range of 0 to MaxPicOrderCntLsb−1, inclusive.

NOTE 1—When gdr_enabled_flag is equal to 1 and PicOrderCntVal of the current picture is greater than or equal to RpPicOrderCntVal of the associated GDR picture, the current and subsequent decoded pictures in output order are exact match to the corresponding pictures produced by starting the decoding process from the previous IRAP picture, when present, preceding the associated GDR picture in decoding order.

VVC Draft 7 Changes END

Thus, in some examples, video encoder 200 may generate encoded pictures for a set of pictures of the video data. Additionally, video encoder 200 may include a picture header NAL unit in a bitstream that comprises the encoded pictures, a first syntax element (e.g., irap_gdr_idc) that indicates whether a picture associated with the picture header NAL unit is: (i) neither an IRAP nor a GDR picture, (ii) an IDR picture, (iii) a CRA picture, or (iv) a GDR picture, wherein: the picture header NAL unit contains syntax elements that apply to all slices of the picture associated with the picture header NAL unit, and the picture associated with the picture header NAL unit is in the set of encoded pictures.

Similarly, in some examples, a device (e.g., video decoder 300 or another type of device) may obtain a bitstream that comprises a set of encoded pictures of the video data. The device may locate IRAP or GDR pictures among the encoded pictures in the bitstream. As part of locating the IRAP or GDR pictures, the device may obtain, from a picture header NAL unit in the bitstream, a first syntax element (e.g., irap_gdr_idc) that indicates whether a picture associated with the picture header NAL unit is: (i) neither an IRAP nor a GDR picture, (ii) an IDR picture, (iii) a CRA picture, or (iv) a GDR picture. Based on the first syntax element indicating that the picture associated with the NAL unit is an IRAP or GDR picture, the device has thereby located the IRAP or GDR picture. The picture header NAL unit contains syntax elements that apply to all slices of the picture associated with the picture header NAL unit. The picture associated with the picture header NAL unit is in the set of encoded pictures.

PH_IRAP_GDR_NUT for Indicating IRAP or GDR Pictures

In accordance with a third technique of this disclosure, a NAL unit type may be defined for picture headers to indicate picture headers associated with IRAPs or GDR pictures. In other words, an IRAP or GDR picture may be indicated as part of a PH_NUT. The particular PH_NUT type may directly indicate the random access picture start or gradual decoder refresh start. This can be achieved in a variety of ways. One example is described below where a single PH_IRAP_GDR_NUT type is indicating an IRAP_GDR type PH_NUT which is just indicating that the picture is an IRAP or GDR picture without specifying the particular type. The slices associated with the picture header would carry sub IRAP or GDR type in their NUTs.

VVC Draft 7 Changes BEGIN 7.3.2.6 Picture Header RBSP Syntax

| | Descriptor |
|---|---|
| picture_header_rbsp( ) { | |
| non_reference_picture_flag | u(1) |
| <!> if(nal_unit_type == PH_IRAP_GDR_NUT)</!> | |
| gdr_pic_flag | u(1) |

-continued

| | Descriptor |
|---|---|
| no_output_of_prior_pics_flag | u(1) |
| if( gdr_pic_flag ) | |
|   recovery_poc_cnt | ue(v) |
| ph_pic_parameter_set_id | ue(v) |
| ... | |

7.4.3.6 Picture Header RBSP Semantics

The PH contains information that is common for all slices of the coded picture associated with the PH.

non_reference_picture_flag equal to 1 specifies the picture associated with the PH is never used as a reference picture. non_reference_picture_flag equal to 0 specifies the picture associated with the PH may or may not be used as a reference picture.

gdr_pic_flag equal to 1 specifies the picture associated with the PH is a GDR picture. gdr_pic_flag equal to 0 specifies that the picture associated with the PH is not a GDR picture. <!>When not present, it is inferred to be equal to 0.</!>

TABLE 5

NAL unit type codes and NAL unit type classes

| nal_unit_type | Name of nal_unit_type | Content of NAL unit and RBSP syntax structure | NAL unit type class |
|---|---|---|---|
| ... | ... | ... | |
| 19 | PH_NUT | Picture header picture_header_rbsp( ) | non-VCL |
| <!>20</!> | <!>PH_IRAP_GDR_NUT</!> | <!>Picture header for IRAP or GDR picture_header_rbsp( )</!> | <!>non-VCL</!> |
| ... | ... | .. | |

VVC Draft 7 Changes END

Thus, in some examples, video encoder 200 may generate encoded pictures for a set of pictures of the video data. In such examples, video encoder 200 may include a picture header NAL unit in a bitstream that comprises the encoded pictures. A NAL unit type of the picture header NAL unit indicates whether a picture associated with the picture header NAL unit is: (i) either an IRAP or a GDR picture, or (ii) the picture associated with the picture header NAL unit is neither an IRAP picture nor a GDR picture. The picture header NAL unit contains syntax elements that apply to all slices of the picture associated with the picture header NAL unit, and the picture associated with the picture header NAL unit is in the set of encoded pictures.

Similarly, in one example, a device (e.g., video decoder 300 or another device) may obtain a bitstream that comprises a set of encoded pictures of the video data. In this example, the device may locate IRAP or GDR pictures among the encoded pictures in the bitstream. As part of locating the IRAP or GDR pictures, the device may determine, based on a NAL unit type of a picture header NAL unit in the bitstream, whether a picture associated with the picture header NAL unit is: (i) either an IRAP or a GDR picture, or (ii) the picture associated with the picture header NAL unit is neither an IRAP picture nor a GDR picture. In this example, the picture header NAL unit contains syntax elements that apply to all slices of the picture associated with the picture header NAL unit and the picture header NAL unit is in the set of encoded pictures.

In accordance with a fourth technique of this disclosure, slice layer NUTs may be signaled in picture headers. For instance, in accordance with the fourth technique of this disclosure, it is proposed to carry the slice layer NUTs (e.g., IDR_W_RADL, CRA_NUT, TRAIL_NUT, . . . ) in the PH_NUT. In this case, the slices can have a generic SLICE_NUT without needing specific NUTs because that would be carried in the picture header associated with the slices. NAL units with NAL unit types of TRAIL_NUT are associated with trailing pictures. Trailing pictures are associated with an IRAP or GDR picture that follow the IRAP or GDR picture in decoding order. For pictures carrying mixed NAL unit types, the generic PH_NUT can be used. For mixed NAL unit type pictures, the individual slice types in this case can be signaled in the slice header. For instance, an irap_gdr_idc field in a slice header may indicate the sub type (i.e. IDR_W_RADL, IDR_N_LP, CRA, GDR).

In such examples, picture headers are mandatory for each picture. In other examples of this disclosure, PHs are not mandatory for each picture. Slice layer specific NUTs can be signalled at PH as PH NUT types and the slice layer NUTs can be replaced by a SLICE_NUT indication with IRAP or GDR indication signaled in the slice header when mixed_nalu_types_in_pic_flag is equal to 1. The slice header level NAL unit types are derived from associated PH_NUT types except for mixed_nal_unit_case.

VVC Draft 7 Changes BEGIN 7.4.3.4 Picture Parameter Set RBSP Semantics mixed_nalu_types_in_pic_flag equal to 1 specifies that each picture referring to the PPS has more than one VCL NAL unit and that the VCL NAL units do not have the same value of nal_unit_type and that the picture is not an IRAP picture. mixed_nalu_types_inpic_flag equal to 0 specifies that each picture referring to the PPS has one or more VCL NAL units and the VCL NAL units of each picture referring to the PPS have the same value of nal_unit_type.

When no_mixed_nalu_types_in_pic_constraint_flag is equal to 1, the value of mixed_nalu_types_in_pic_flag shall be equal to 0.

For each slice with a nal_unit_type value nalUnitTypeA in the range of IDR_W_RADL to CRA_NUT, inclusive, in a picture picA that also contains one or more slices with another value of nal_unit_type (i.e., the value of mixed_nalu_types_in_pic_flag for the picture picA is equal to 1), the following applies:

The slice shall belong to a subpicture subpicA for which the value of the corresponding subpic_treated_as_pic_flag[i] is equal to 1.

The slice shall not belong to a subpicture of picA containing VCL NAL units with nal_unit_type not equal to nalUnitTypeA.

For all the following PUs in the CLVS in decoding order, neither RefPicList[0] nor RefPicList[1] of a slice in subpicA shall include any picture preceding picA in decoding order in an active entry.

7.3.7.1 General Slice Header Syntax

| | Descriptor |
|---|---|
| slice_header( ) { | |
|   slice_pic_order_cnt_lsb | u(v) |
|   if( subpics_present_flag ) | |
|     slice_subpic_id | u(v) |
|   <!> if (mixed_nalu_types_in_pic_flag == 1 )</!> | |
|   <!>   irap_gdr_idc</!> | <!>u(2)</!> |
|   if( rect_slice_flag || NumTilesInPic > 1 ) | |
|     slice_address | u(v) |
|   if( !rect_slice_flag && NumTilesInPic > 1 ) | |
|     num_tiles_in_slice_minus1 | ue(v) |
|   slice_type | ue(v) |

<!>irap_gdr_idc equal to 0 indicates IDR_W_RADL picture. irap_gdr_pic_idc equal to 1 indicates IDR_N_LP, picture, irap_gdr_idc equal to 2 indicates CRA picture. irap_gdr_idc equal to 3 indicates GDR picture.</!>

VVC Draft 7 Changes END

Thus, in some examples, video encoder 200 may generate a bitstream that comprises a set of encoded pictures of the video data and a picture header NAL unit associated with a picture in the set of encoded pictures. As part of generating the bitstream, video encoder 200 may include a first syntax element in the bitstream that indicates that there are multiple MAL unit types in the picture associated with the picture header NAL unit. Video encoder 200 may include, based on there being multiple NAL unit types in the picture associated with the picture header NAL unit, a second syntax element in the picture header NAL unit. The second syntax element indicates whether the picture associated with the picture header NAL unit is (i) an IDR with RADL picture, (ii) an IDR with no leading pictures picture, (iii) a CRA picture, or (iv) a GDR picture.

Similarly, in this example, a device (e.g., video decoder 300 or another device) may obtain a bitstream that comprises a set of encoded pictures of the video data and a picture header NAL unit associated with a picture in the set of encoded pictures. The device may obtain, based on a first syntax element indicating that there are multiple NAL unit types in the picture associated with the picture header NAL unit, a second syntax element from the picture header NAL unit, wherein the second syntax element indicates whether the picture associated with the picture header NAL unit is (i) an Instantaneous Decoder Refresh (IDR) with Random Access Decodable Leading (RADL) picture, (ii) an IDR with no leading pictures picture, (iii) a Clean Random Access (CRA) picture, or (iv) a Gradual Decoder Refresh (GDR) picture.

In VVC (Draft 7) specification recovery_poc_cnt is signaled in PH if the picture is a GDR picture. For a mixed NAL unit case where a GDR slice can be combined with IRAP slices, resulting in a non-GDR picture. The recovery_poc_cnt of the GDR slice needs to be signalled. In accordance with a fifth technique of this disclosure, recovery_poc_cnt may be signaled at a subpicture/slice level or the definition of the gdr_pic_flag may be changed to include mixed NAL unit types in pictures that have GDR slices.

VVC Draft 7 Changes Begin 7.3.7.1 General Slice Header Syntax

| | Descriptor |
|---|---|
| slice_header( ) { | |
|   slice_pic_order_cnt_lsb | u(v) |
|   if( subpics_present_flag ) | |
|     slice_subpic_id | u(v) |
|   <!> if (mixed_nalu_types_in_pic_flag == 1 && nal_unit_type == GDR_NUT )</!> | |
|   <!>   recovery_poc_cnt</!> | <!>ue(v)</!> |
|   if( rect_slice_flag || NumTilesInPic > 1 ) | |
|     slice_address | u(v) |
|   if( !rect_slice_flag && NumTilesInPic > 1 ) | |
|     num_tiles_in_slice_minus1 | ue(v) |
|   slice_type | ue(v) | recovery_poc_cnt specifies the recovery point of decoded pictures in output order. If the current picture is a GDR picture that is associated with the PH and there is a picture picA that follows the current GDR picture in decoding order in the CLVS and that has PicOrderCntVal equal to the PicOrderCntVal of the current GDR picture plus the value of recovery_poc_cnt, the picture picA is referred to as the recovery point picture. Otherwise, the first picture in output order that has PicOrderCntVal greater than the PicOrderCntVal of the current picture plus the value of recovery_poc_cnt is referred to as the recovery point picture. The recovery point picture shall not precede the current GDR picture in decoding order. The value of recovery_poc_cnt shall be in the range of 0 to MaxPicOrderCntLsb−1, inclusive.

NOTE 1—When gdr_enabled_flag is equal to 1 and PicOrderCntVal of the current picture is greater than or equal to RpPicOrderCntVal of the associated GDR picture, the current and subsequent decoded pictures in output order are exact match to the corresponding pictures produced by starting the decoding process from the previous IRAP picture, when present, preceding the associated GDR picture in decoding order.

3.1 gradual decoding refresh (GDR) picture: A picture for which each VCL NAL unit has nal_unit_type equal to GDR_NUT.

7.4.3.6 Picture Header RBSP Semantics

The PH contains information that is common for all slices of the coded picture associated with the PH.

non_reference_picture_flag equal to 1 specifies the picture associated with the PH is never used as a reference picture. non_reference_picture_flag equal to 0 specifies the picture associated with the PH may or may not be used as a reference picture.

gdr_pic_flag equal to 1 specifies the picture associated with the PH <dlt>is</dlt><!> contains<!> GDR <dlt>picture</dlt><!>slices</!>. gdr_pic_flag equal to 0 specifies that the picture associated with the PH is not a GDR picture.

VVC Draft 7 Changes End

Thus, in some examples, video encoder 200 may generate encoded pictures for a set of pictures of the video data and a picture header NAL unit associated with a picture in the set of encoded pictures. Video encoder 200 may include, in a slice header, a first syntax element indicating that there are multiple NAL unit types in the picture associated with the picture header NAL unit and a NAL unit type of the picture header NAL unit is a GDR picture NAL unit type. Based on there being multiple NAL unit types in the picture associated with the picture header NAL unit and the NAL unit type of the picture header NAL unit being a GDR picture NAL unit type, video encoder 200 may include a second syntax element in the picture header that indicates a recovery point.

Similarly, in some examples, video decoder 300 or another device may obtain a bitstream that comprises a set of encoded pictures of the video data and a picture header NAL unit associated with a picture in the set of encoded pictures. Video decoder 300 may obtain, based on a first syntax element indicating that there are multiple NAL unit types in the picture associated with the picture header NAL unit and a NAL unit type of the picture header NAL unit being a GDR picture NAL unit type, a second syntax element that indicates a recovery point.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2:
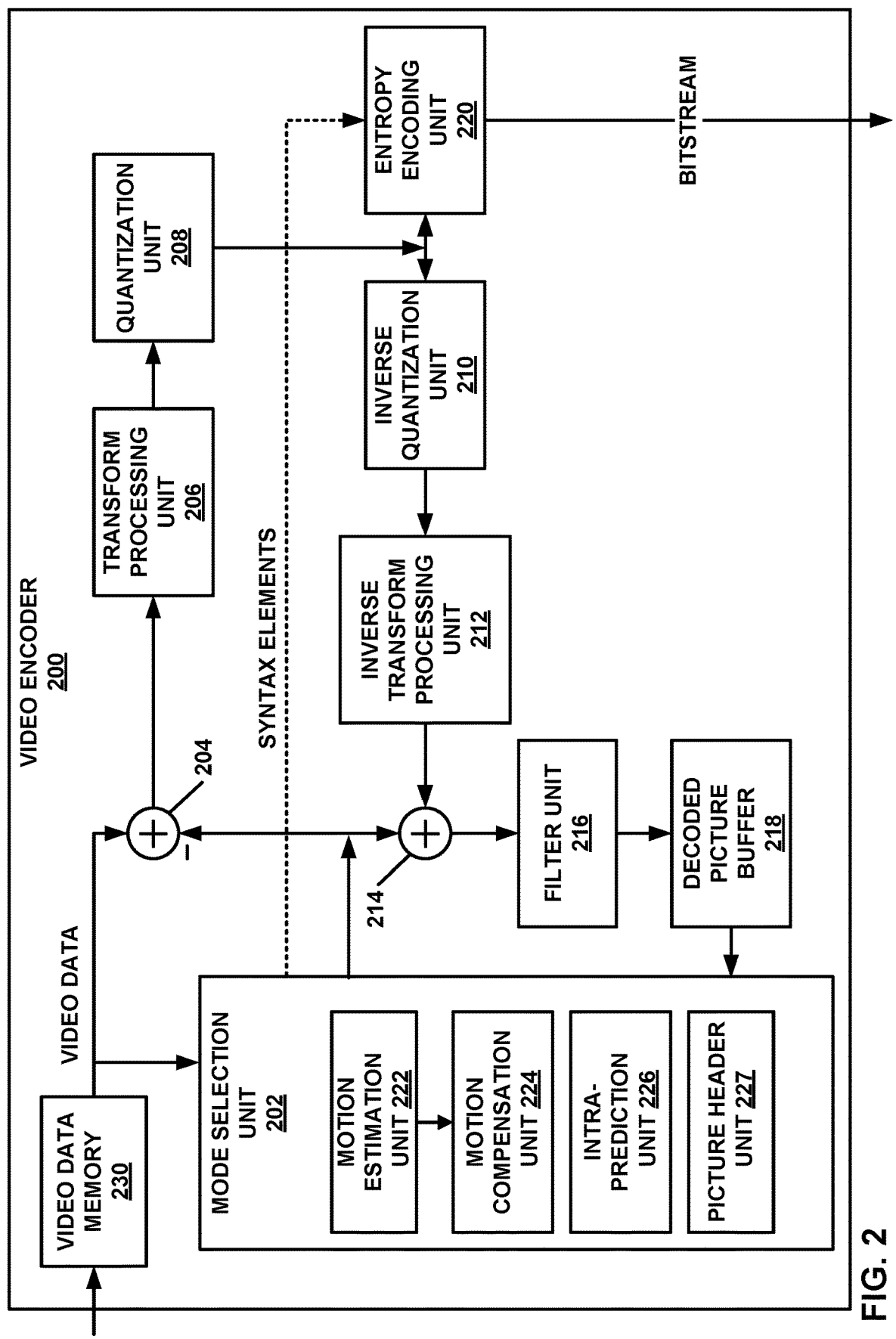
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266/VVC video coding standard in development. However, the techniques of this disclosure are not limited to these video coding standards, and are applicable generally to video encoding and decoding.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously encoded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

Furthermore, in some examples, mode selection unit 202 may determine whether a picture is to be encoded as an IRAP, a GDR picture, or another type of picture. Mode selection unit 202 may also generate picture headers for encoded pictures. Accordingly, in the example of FIG. 2, mode selection unit 202 includes a picture header unit 229. Picture header unit 229 may generate picture headers in accordance with any of the techniques of this disclosure. For instance, picture header unit 229 may generate a picture header NAL unit that includes a syntax element that indicates that a picture associated with the picture header NAL unit must be either an IRAP or a GDR picture. This picture header NAL unit contains syntax elements that apply to all slices of the picture associated with the picture header NAL unit.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to generate encoded pictures for a set of pictures of the video data; and include a picture header NAL unit in a bitstream that comprises the encoded pictures, wherein the picture header NAL unit includes a first syntax element that indicates that a picture associated with the picture header NAL unit must be either an IRAP or a GDR picture, wherein: the picture header NAL unit contains syntax elements that apply to all slices of the picture associated with the picture header NAL unit, and the picture associated with the picture header NAL unit is in the set of encoded pictures.

In some examples, the processing units of video encoder 200 may be configured to generate encoded pictures for a set of pictures of the video data; and include a picture header NAL unit in a bitstream that comprises the encoded pictures, a first syntax element that indicates whether a picture associated with the picture header NAL unit is: (i) neither an IRAP nor a GDR picture, (ii) an IDR picture, (iii) a CRA picture, or (iv) a GDR picture, wherein: the picture header NAL unit contains syntax elements that apply to all slices of the picture associated with the picture header NAL unit, and the picture associated with the picture header NAL unit is in the set of encoded pictures.

In some examples, the processing units of video encoder 200 may be configured to generate encoded pictures for a set of pictures of the video data; and include a picture header NAL unit in a bitstream that comprises the encoded pictures, wherein a NAL unit type of the picture header NAL unit indicates whether a picture associated with the picture header NAL unit is: (i) either an IRAP or a GDR picture, or (ii) the picture associated with the picture header NAL unit is neither an IRAP picture nor a GDR picture, wherein: the picture header NAL unit contains syntax elements that apply to all slices of the picture associated with the picture header NAL unit, and the picture associated with the picture header NAL unit is in the set of encoded pictures.

In some examples, the processing units of video encoder 200 may be configured to generate a bitstream that comprises a set of encoded pictures of the video data and a picture header Network Abstraction Layer (NAL) unit associated with a picture in the set of encoded pictures, wherein generating the bitstream comprises: based on a first syntax element indicating that there are multiple NAL unit types in the picture associated with the picture header NAL unit, including a second syntax element in the picture header NAL unit, wherein the second syntax element indicates whether the picture associated with the picture header NAL unit is (i) an IDR with RADL picture, (ii) an IDR with no leading pictures picture, (iii) a CRA picture, or (iv) a GDR picture.

In some examples, the processing units of video encoder 200 may be configured to generate encoded pictures for a set of pictures of the video data and a picture header NAL unit associated with a picture in the set of encoded pictures; and include, based on a syntax element indicating that there are multiple NAL unit types in the picture associated with the picture header NAL unit and a NAL unit type of the picture header NAL unit is a GDR picture NAL unit type, a syntax element that indicates a recovery point.

Figure 3:
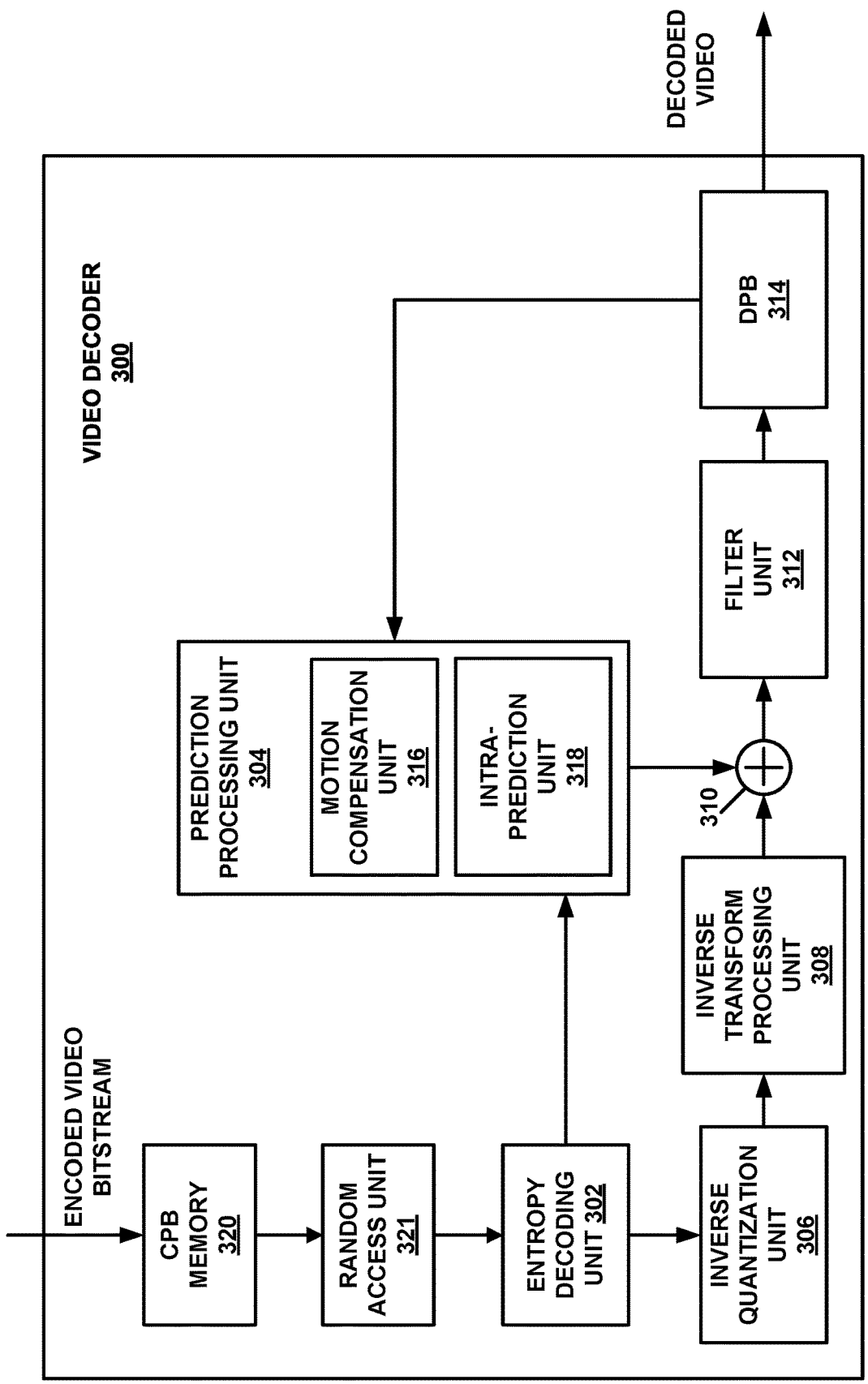
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of an encoded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve encoded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from CPB memory 320 and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In the example of FIG. 3, video decoder 300 includes a random access unit 321 that may enable video decoder 300 to perform random access. As part of performing random access, random access unit 321 may locate IRAP and GDR pictures, along with associated picture headers, in accordance with one or more techniques of this disclosure. For instance, in one example, random access unit 321 may locate IRAP or GDR pictures among the encoded pictures in the bitstream. As part of locating the IRAP or GDR pictures, random access unit 321 may obtain, from a picture header NAL unit in the bitstream, a syntax element that indicates that a picture associated with the picture header NAL unit must be either an IRAP or a GDR picture. Random access unit 321 may determine, based on the syntax element, that the picture associated with the picture header NAL unit is an IRAP or a GDR picture, In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to obtain a bitstream that comprises a set of encoded pictures of the video data; and locate IRAP or GDR pictures among the encoded pictures in the bitstream, wherein locating the IRAP or GDR pictures comprises: obtaining, from a picture header NAL unit in the bitstream, a first syntax element that indicates that a picture associated with the picture header NAL unit must be either an IRAP or a GDR picture; and determine, based on the syntax element, that the picture associated with the picture header NAL unit is an IRAP or a GDR picture. The picture header NAL unit contains syntax elements that apply to all slices of the picture associated with the picture header NAL unit, and the picture associated with the picture header NAL unit is in the set of encoded pictures.

In some examples, the processing units of video decoder 300 are configured to obtain a bitstream that comprises a set of encoded pictures of the video data; and locate IRAPs or GDR pictures among the encoded pictures in the bitstream, wherein locating the IRAP or GDR pictures comprises: obtaining, from a picture header NAL unit in the bitstream, a first syntax element that indicates whether a picture associated with the picture header NAL unit is: (i) neither an IRAP nor a GDR picture, (ii) an Instantaneous Decoding Refresh (IDR) picture, (iii) a CRA picture, or (iv) a GDR picture, wherein: the picture header NAL unit contains syntax elements that apply to all slices of the picture associated with the picture header NAL unit, and the picture associated with the picture header NAL unit is in the set of encoded pictures.

In some examples, the processing units of video decoder 300 are configured to obtain a bitstream that comprises a set of encoded pictures of the video data; and locate intra random access pictures (IRAP) or Gradual Decoder Refresh (GDR) pictures among the encoded pictures in the bitstream, wherein locating the IRAP or GDR pictures comprises: determining, based on a Network Abstraction Layer (NAL) unit type of a picture header NAL unit in the bitstream, whether a picture associated with the picture header NAL unit is: (i) either an Intra Random Access Picture (IRAP) or a Gradual Decoder Refresh (GDR) picture, or (ii) the picture associated with the picture header NAL unit is neither an IRAP picture nor a GDR picture, wherein: the picture header NAL unit contains syntax elements that apply to all slices of the picture associated with the picture header NAL unit, and the picture associated with the picture header NAL unit is in the set of encoded pictures.

In some examples, the processing units of video decoder 300 are configured to obtain a bitstream that comprises a set of encoded pictures of the video data and a picture header Network Abstraction Layer (NAL) unit associated with a picture in the set of encoded pictures; and obtain, based on a first syntax element indicating that there are multiple NAL unit types in the picture associated with the picture header NAL unit, a second syntax element from the picture header NAL unit, wherein the second syntax element indicates whether the picture associated with the picture header NAL unit is (i) an Instantaneous Decoder Refresh (IDR) with Random Access Decodable Leading (RADL) picture, (ii) an IDR with no leading pictures picture, (iii) a Clean Random Access (CRA) picture, or (iv) a Gradual Decoder Refresh (GDR) picture.

In some examples, the processing units of video decoder 300 are configured to obtain a bitstream that comprises a set of encoded pictures of the video data and a picture header Network Abstraction Layer (NAL) unit associated with a picture in the set of encoded pictures; and obtain, based on a syntax element indicating that there are multiple NAL unit types in the picture associated with the picture header NAL unit and a NAL unit type of the picture header NAL unit is a Gradual Decoder Refresh (GDR) picture NAL unit type, a syntax element that indicates a recovery point.

Figure 4:
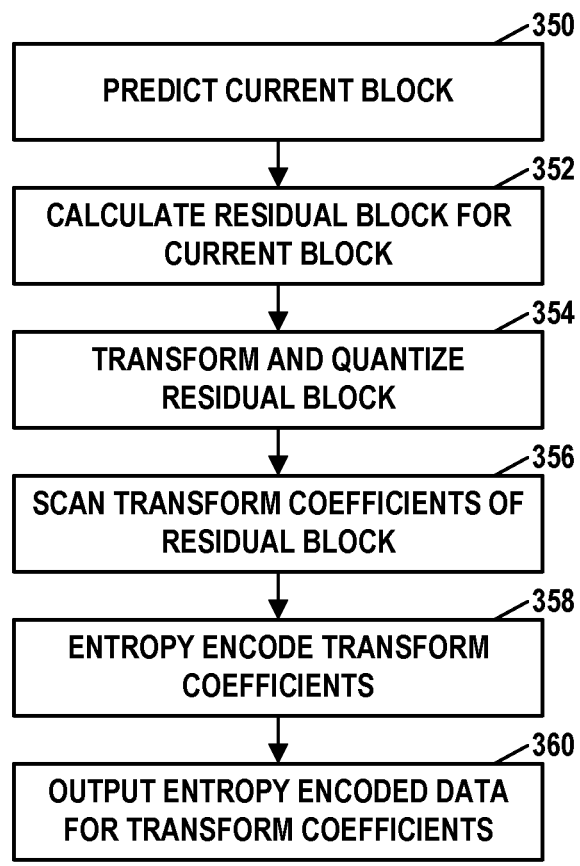
FIG. 4 is a flowchart illustrating an example method for encoding a current block.

FIG. 4 is a flowchart illustrating an example method for encoding a current block. The current block may comprise a current CU. Although described with respect to video encoder 200 (FIGS. 1 and 2), it should be understood that other devices may be configured to perform a method similar to that of FIG. 4.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 5:
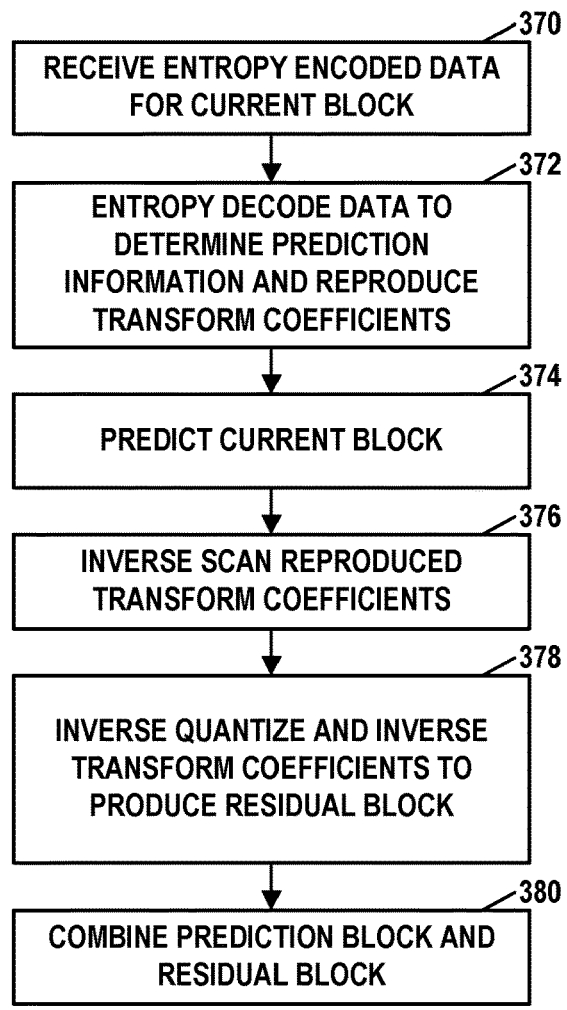
FIG. 5 is a flowchart illustrating an example method for decoding a current block of video data.

FIG. 5 is a flowchart illustrating an example method for decoding a current block of video data. The current block may comprise a current CU. Although described with respect to video decoder 300 (FIGS. 1 and 3), it should be understood that other devices may be configured to perform a method similar to that of FIG. 5.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize and inverse transform the transform coefficients to produce a residual block (378). Video decoder 300 may ultimately decode the current block by combining the prediction block and the residual block (380).

Figure 6:
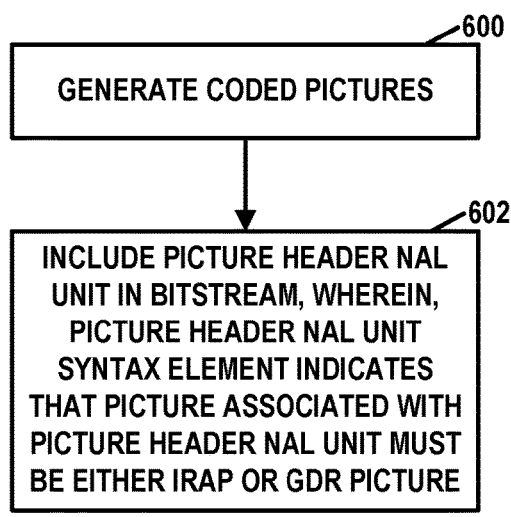
FIG. 6 is a flowchart illustrating an example operation of a video encoder, in accordance with one or more techniques of this disclosure.

FIG. 6 is a flowchart illustrating an example operation of video encoder 200, in accordance with one or more techniques of this disclosure. In the example of FIG. 6, video encoder 200 may generate encoded pictures for a set of pictures of the video data (600). For example, video encoder 200 may encode pictures, e.g., as described with respect to FIG. 2.

Additionally, video encoder 200 may include a picture header NAL unit in a bitstream that comprises the encoded pictures (602). The picture header NAL unit includes a syntax element (e.g., irap_or_gdr_pic_flag) that indicates that a picture associated with the picture header NAL unit must be either an IRAP or a GDR picture. For instance, the syntax element may indicate that the picture associated with the picture header NAL unit is either an IRAP or GDR picture and not any other type of picture if the syntax element is equal to 1. The picture header NAL unit contains syntax elements that apply to all slices of the picture associated with the picture header NAL unit. The picture associated with the picture header NAL unit is in the set of encoded pictures.

Figure 7:
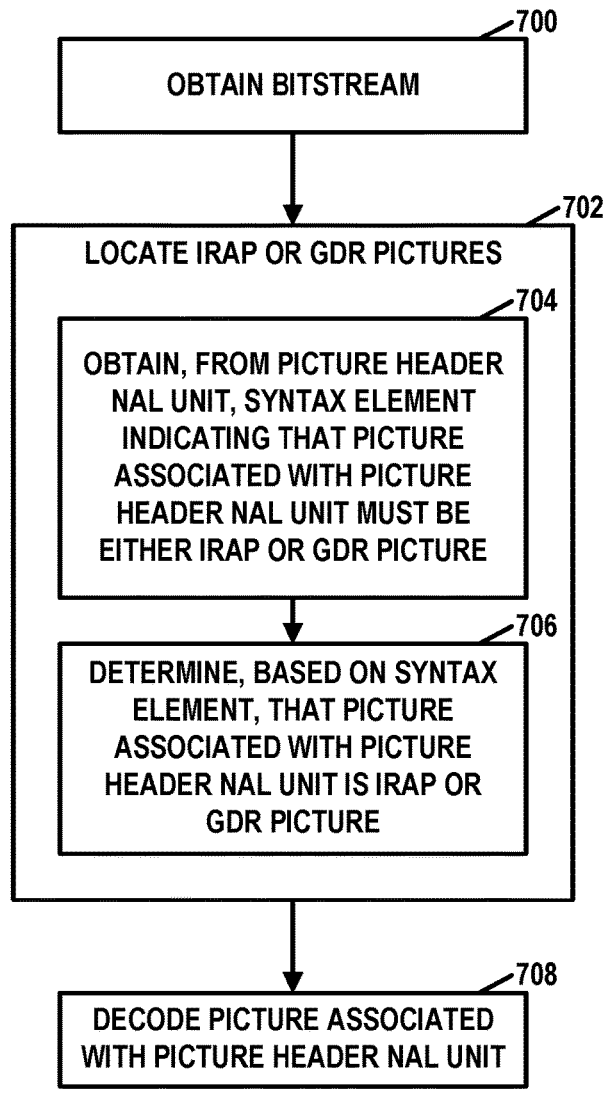
FIG. 7 is a flowchart illustrating an example operation for processing video data, in accordance with one or more techniques of this disclosure.

FIG. 7 is a flowchart illustrating an example operation for processing video data, in accordance with one or more techniques of this disclosure. Processing video data may include decoding video data, handling video data for transmission to other devices, and other actions involving video data. The operation of FIG. 7 may be performed by video decoder 300, destination device 116, or another device, such as an intermediate network device. For ease of explanation, this disclosure describes FIG. 7 with reference to video decoder 300.

In the example of FIG. 7, video decoder 300 obtains a bitstream that comprises a set of encoded pictures of the video data (700). Furthermore, video decoder 300 may locate IRAP or GDR pictures among the encoded pictures in the bitstream (702). As part of locating the IRAP or GDR pictures, video decoder 300 may obtain, from a picture header NAL unit in the bitstream, a syntax element (e.g., irap_or_gdr_pic_flag) that indicates that a picture associated with the picture header NAL unit must be either an IRAP or a GDR picture (704). Video decoder 300 may determine, based on the syntax element, that the picture associated with the picture header NAL unit is an IRAP or a GDR picture (706). The picture header NAL unit contains syntax elements that apply to all slices of the picture associated with the picture header NAL unit. The picture associated with the picture header NAL unit is in the set of encoded pictures.

Furthermore, in the example of FIG. 7, video decoder 300 may decode the picture associated with the picture header NAL unit (708). For instance, video decoder 300 may decode the picture as described with respect to FIG. 3. In other examples, after a device locates an IRAP or GDR picture, the device may provide an indication of the locations of the IRAP and GDR pictures to another device, e.g., for decoding the pictures.

The following is a non-limiting list of aspects in accordance with one or more techniques of this disclosure.

Aspect 1A. A method of processing video data, the method comprising: obtaining a bitstream that comprises a set of coded pictures of the video data; and locating intra random access pictures (IRAP) or Gradual Decoder Refresh (GDR) pictures among the coded pictures in the bitstream, wherein locating the IRAP or GDR pictures comprises: obtaining, from a picture header Network Abstraction Layer (NAL) unit in the bitstream, a first syntax element that indicates whether a picture associated with the picture header NAL unit is an Intra Random Access Picture (IRAP) or a Gradual Decoder Refresh (GDR) picture or whether the picture associated with the picture header NAL unit is neither an IRAP nor a GDR picture, wherein: the picture header NAL unit contains syntax elements that apply to all slices of the picture associated with the picture header NAL unit, and the picture associated with the picture header NAL unit is in the set of coded pictures.

Aspect 2A. The method of aspect 1A, further comprising: based on the first syntax element indicating that the picture associated with the picture header NAL unit is an IRAP or a GDR picture, obtaining, from the picture header NAL unit, a second syntax element that indicates whether the picture associated with the picture header NAL unit is a GDR picture.

Aspect 3A. The method of any of aspects 1A-2A, further comprising decoding the picture associated with the picture header NAL unit.

Aspect 4A. A method of encoding video data, the method comprising: generating coded pictures for a set of pictures of the video data; and including a picture header Network Abstraction Layer (NAL) unit in a bitstream that comprises the coded pictures, wherein the picture header NAL unit includes a first syntax element that indicates whether a picture associated with the picture header NAL unit is an Intra Random Access Picture (IRAP) or a Gradual Decoder Refresh (GDR) picture or whether the picture associated with the picture header NAL unit is neither an IRAP nor a GDR picture, wherein: the picture header NAL unit contains syntax elements that apply to all slices of the picture associated with the picture header NAL unit, and the picture associated with the picture header NAL unit is in the set of coded pictures.

Aspect 5A. The method of aspect 4A, wherein, based on the picture being an IRAP or a GDR picture, the picture header NAL unit includes a second syntax element that indicates whether the picture is a GDR picture.

Aspect 1B. A method of processing video data, the method comprising: obtaining a bitstream that comprises a set of coded pictures of the video data; and locating intra random access pictures (IRAP) or Gradual Decoder Refresh (GDR) pictures among the coded pictures in the bitstream, wherein locating the IRAP or GDR pictures comprises: obtaining, from a picture header Network Abstraction Layer (NAL) unit in the bitstream, a first syntax element that indicates whether a picture associated with the picture header NAL unit is: (i) neither an Intra Random Access Picture (IRAP) nor a Gradual Decoder Refresh (GDR) picture, (ii) an Instantaneous Decoding Refresh (IDR) picture, (iii) a Clean Random Access (CRA) picture, or (iv) a GDR picture, wherein: the picture header NAL unit contains syntax elements that apply to all slices of the picture associated with the picture header NAL unit, and the picture associated with the picture header NAL unit is in the set of coded pictures.

Aspect 2B. The method of aspect 1B, further comprising: based on the first syntax element indicating that the picture associated with the picture header NAL unit is a GDR picture, obtaining, from the picture header NAL unit, a second syntax element that indicates a recovery point for the picture associated with the picture header NAL unit.

Aspect 3B. The method of any of aspects 1B-2B, further comprising decoding the picture associated with the picture header NAL unit.

Aspect 4B. A method of encoding video data, the method comprising: generating coded pictures for a set of pictures of the video data; and including a picture header Network Abstraction Layer (NAL) unit in a bitstream that comprises the coded pictures, a first syntax element that indicates whether a picture associated with the picture header NAL unit is: (i) neither an Intra Random Access Picture (IRAP) nor a Gradual Decoder Refresh (GDR) picture, (ii) an Instantaneous Decoding Refresh (IDR) picture, (iii) a Clean Random Access (CRA) picture, or (iv) a GDR picture, wherein: the picture header NAL unit contains syntax elements that apply to all slices of the picture associated with the picture header NAL unit, and the picture associated with the picture header NAL unit is in the set of coded pictures.

Aspect 5B. The method of aspect 4B, further comprising: based on the picture associated with the picture header NAL unit being a GDR picture, including, in the picture header NAL unit, a second syntax element that indicates a recovery point for the picture associated with the picture header NAL unit.

Aspect 1C. A method of processing video data, the method comprising: obtaining a bitstream that comprises a set of coded pictures of the video data; and locating intra random access pictures (IRAP) or Gradual Decoder Refresh (GDR) pictures among the coded pictures in the bitstream, wherein locating the IRAP or GDR pictures comprises: determining, based on a Network Abstraction Layer (NAL) unit type of a picture header NAL unit in the bitstream, whether a picture associated with the picture header NAL unit is: (i) either an Intra Random Access Picture (IRAP) or a Gradual Decoder Refresh (GDR) picture, or (ii) the picture associated with the picture header NAL unit is neither an IRAP picture nor a GDR picture, wherein: the picture header NAL unit contains syntax elements that apply to all slices of the picture associated with the picture header NAL unit, and the picture associated with the picture header NAL unit is in the set of coded pictures.

Aspect 2C. The method of aspect 1C, further comprising: based on the NAL unit type of the picture header NAL unit indicating that the picture associated with the picture header NAL unit is either an IRAP or a GDR picture, obtaining, from the picture header NAL unit, a second syntax element that indicates whether the picture associated with the picture header NAL unit is a GDR picture.

Aspect 3C. The method of any of aspects 1C-2C, further comprising decoding the picture associated with the picture header NAL unit.

Aspect 4C. A method of encoding video data, the method comprising: generating coded pictures for a set of pictures of the video data; and including a picture header Network Abstraction Layer (NAL) unit in a bitstream that comprises the coded pictures, wherein a NAL unit type of the picture header NAL unit indicates whether a picture associated with the picture header NAL unit is: (i) either an Intra Random Access Picture (IRAP) or a Gradual Decoder Refresh (GDR) picture, or (ii) the picture associated with the picture header NAL unit is neither an IRAP picture nor a GDR picture, wherein: the picture header NAL unit contains syntax elements that apply to all slices of the picture associated with the picture header NAL unit, and the picture associated with the picture header NAL unit is in the set of coded pictures.

Aspect 5C. The method of aspect 4C, further comprising: based on the picture associated with the picture header NAL unit being a GDR picture, including, in the picture header NAL unit, a second syntax element that indicates whether the picture associated with the picture header NAL unit is a GDR picture.

Aspect 1D. A method of processing video data, the method comprising: obtaining a bitstream that comprises a set of coded pictures of the video data and a picture header Network Abstraction Layer (NAL) unit associated with a picture in the set of coded pictures; and obtaining, based on a first syntax element indicating that there are multiple NAL unit types in the picture associated with the picture header NAL unit, a second syntax element from the picture header NAL unit, wherein the second syntax element indicates whether the picture associated with the picture header NAL unit is (i) an Instantaneous Decoder Refresh (IDR) with Random Access Decodable Leading (RADL) picture, (ii) an IDR with no leading pictures picture, (iii) a Clean Random Access (CRA) picture, or (iv) a Gradual Decoder Refresh (GDR) picture.

Aspect 2D. The method of aspect 1D, wherein: the picture header NAL unit is a first picture header NAL unit, and the method further comprises: obtaining a second picture header NAL unit from the bitstream; and based on a third syntax element indicating that there are not multiple NAL unit types in a picture associated with the second picture header NAL unit, determining a picture type of the picture associated with the second picture header NAL unit based on a NAL unit type of the second picture header NAL unit.

Aspect 3D. The method of any of aspects 1D-2D, further comprising at least one of decoding the picture associated with the first picture header NAL unit and decoding the picture associated with the second picture header NAL unit.

Aspect 4D. A method of encoding video data, the method comprising: generating a bitstream that comprises a set of coded pictures of the video data and a picture header Network Abstraction Layer (NAL) unit associated with a picture in the set of coded pictures, wherein generating the bitstream comprises: based on a first syntax element indicating that there are multiple NAL unit types in the picture associated with the picture header NAL unit, including a second syntax element in the picture header NAL unit, wherein the second syntax element indicates whether the picture associated with the picture header NAL unit is (i) an Instantaneous Decoder Refresh (IDR) with Random Access Decodable Leading (RADL) picture, (ii) an IDR with no leading pictures picture, (iii) a Clean Random Access (CRA) picture, or (iv) a Gradual Decoder Refresh (GDR) picture.

Aspect 5D. The method of aspect 4D, wherein: the picture header NAL unit is a first picture header NAL unit, and generating the bitstream further comprises: including a second picture header NAL unit in the bitstream, wherein, based on there not being multiple NAL unit types in a picture associated with the second picture header NAL unit, a NAL unit type of the second picture header indicates a picture type of the picture associated with the second picture header NAL unit.

Aspect 1E. A method of processing video data, the method comprising: obtaining a bitstream that comprises a set of coded pictures of the video data and a picture header Network Abstraction Layer (NAL) unit associated with a picture in the set of coded pictures; and obtaining, based on a syntax element indicating that there are multiple NAL unit types in the picture associated with the picture header NAL unit and a NAL unit type of the picture header NAL unit is a Gradual Decoder Refresh (GDR) picture NAL unit type, a syntax element that indicates a recovery point.

Aspect 2E. The method of aspect 1E, further comprising decoding the picture associated with the picture header NAL unit.

Aspect 3E. A method of encoding video data, the method comprising: generating coded pictures for a set of pictures of the video data and a picture header Network Abstraction Layer (NAL) unit associated with a picture in the set of coded pictures; and including, based on a syntax element indicating that there are multiple NAL unit types in the picture associated with the picture header NAL unit and a NAL unit type of the picture header NAL unit is a Gradual Decoder Refresh (GDR) picture NAL unit type, a syntax element that indicates a recovery point.

Aspect 1F. The method of any of aspects 1A-5A, 1B-3B, 1C-3C, 1D-3D, 1E, or 2E, further comprising performing random access of the bitstream starting from the IRAP or GDR picture.

Aspect 2F. The method of aspect 1F, wherein performing random access of the bitstream starting from the IRAP picture comprises performing at least one of a clean random access, an instantaneous decoder refresh, or a broken link access process.

Aspect 3F. The method of aspect 1F, wherein performing random access of the bitstream starting from the GDR picture comprises performing a gradual decoding refresh process.

Aspect 1G. A device for coding video data, the device comprising one or more means for performing the method of any of aspects 1A-3F.

Aspect 2G. The device of aspect 1G, wherein the one or more means comprise one or more processors implemented in circuitry.

Aspect 3G. The device of any of aspects 1G and 2G, further comprising a memory to store the video data.

Aspect 4G. The device of any of aspects 1G-3G, further comprising a display configured to display decoded video data.

Aspect 5G. The device of any of aspects 1G-4G, wherein the device comprises one or more of a camera, a computer, a mobile device, a broadcast receiver device, or a set-top box.

Aspect 6G. The device of any of aspects 1G-5G, wherein the device comprises a video decoder.

Aspect 7G. The device of any of aspects 1G-6G, wherein the device comprises a video encoder.

Aspect 8H. A computer-readable storage medium having stored thereon instructions that, when executed, cause one or more processors to perform the method of any of aspects 1A-3F.

Aspect 1I. A method of processing video data, the method comprising:

obtaining a bitstream that comprises a set of encoded pictures of the video data; and locating intra random access pictures (IRAP) or Gradual Decoder Refresh (GDR) pictures among the encoded pictures in the bitstream, wherein locating the IRAP or GDR pictures comprises: obtaining, from a picture header Network Abstraction Layer (NAL) unit in the bitstream, a syntax element that indicates that a picture associated with the picture header NAL unit must be either an Intra Random Access Picture (IRAP) or a Gradual Decoder Refresh (GDR) picture; and determining, based on the syntax element, that the picture associated with the picture header NAL unit is an IRAP or a GDR picture, wherein: the picture header NAL unit contains syntax elements that apply to all slices of the picture associated with the picture header NAL unit, and the picture associated with the picture header NAL unit is in the set of encoded pictures.

Aspect 2I. The method of aspect 1I, wherein the syntax element is a first syntax element, the method further comprising: based on the first syntax element indicating that the picture associated with the picture header NAL unit is an IRAP or a GDR picture, obtaining, from the picture header NAL unit, a second syntax element that indicates whether the picture associated with the picture header NAL unit is a GDR picture.

Aspect 3I. The method of aspect 1I or 2I, further comprising decoding the picture associated with the picture header NAL unit.

Aspect 4I. A method of encoding video data, the method comprising: generating encoded pictures for a set of pictures of the video data; and including a picture header Network Abstraction Layer (NAL) unit in a bitstream that comprises the encoded pictures, wherein the picture header NAL unit includes a syntax element that indicates that a picture associated with the picture header NAL unit must be either an Intra Random Access Picture (IRAP) or a Gradual Decoder Refresh (GDR) picture, wherein: the picture header NAL unit contains syntax elements that apply to all slices of the picture associated with the picture header NAL unit, and the picture associated with the picture header NAL unit is in the set of encoded pictures.

Aspect 5I. The method of aspect 4I, wherein the method further comprises, based on the picture being an IRAP or a GDR picture, including, in the picture header NAL unit, a second syntax element that indicates whether the picture is a GDR picture.

Aspect 6I. A device for processing video data, the device comprising: a memory configured to store encoded pictures of the video data; and one or more processors implemented in circuitry, the one or more processors configured to: locate intra random access pictures (IRAP) or Gradual Decoder Refresh (GDR) pictures among the encoded pictures in the bitstream, wherein the one or more processors are configured such that, as part of locating the IRAP or GDR pictures, the one or more processors: obtain, from a picture header Network Abstraction Layer (NAL) unit in the bitstream, a syntax element that indicates that a picture associated with the picture header NAL unit must be either an Intra Random Access Picture (IRAP) or a Gradual Decoder Refresh (GDR) picture; and determine, based on the syntax element, that the picture associated with the picture header NAL unit is an IRAP or a GDR picture, wherein: the picture header NAL unit contains syntax elements that apply to all slices of the picture associated with the picture header NAL unit, and the picture associated with the picture header NAL unit is in the set of encoded pictures.

Aspect 7I. The device of aspect 6I, wherein the syntax element is a first syntax element, the one or more processors are further configured to: based on the first syntax element indicating that the picture associated with the picture header NAL unit is an IRAP or a GDR picture, obtain, from the picture header NAL unit, a second syntax element that indicates whether the picture associated with the picture header NAL unit is a GDR picture.

Aspect 8I. The device of aspects 6I or 7I, wherein the one or more processors are further configured to decode the picture associated with the picture header NAL unit.

Aspect 9I. A device for encoding video data, the device comprising: a memory configured to store the video data; and one or more processors implemented in circuitry, the one or more processors configured to: generate encoded pictures for a set of pictures of the video data; and include a picture header Network Abstraction Layer (NAL) unit in a bitstream that comprises the encoded pictures, wherein the picture header NAL unit includes a syntax element that indicates that a picture associated with the picture header NAL unit must be either an Intra Random Access Picture (IRAP) or a Gradual Decoder Refresh (GDR) picture, wherein: the picture header NAL unit contains syntax elements that apply to all slices of the picture associated with the picture header NAL unit, and the picture associated with the picture header NAL unit is in the set of encoded pictures.

Aspect 10I. The device of aspect 9I, wherein the one or more processors are further configured to, based on the picture being an IRAP or a GDR picture, include, in the picture header NAL unit, a second syntax element that indicates whether the picture is a GDR picture.

Aspect 11I. A device for processing video data, the device comprising: means for a bitstream that comprises a set of encoded pictures of the video data; and means for locating intra random access pictures (IRAP) or Gradual Decoder Refresh (GDR) pictures among the encoded pictures in the bitstream, wherein the means for locating the IRAP or GDR pictures comprises: means for obtaining, from a picture header Network Abstraction Layer (NAL) unit in the bitstream, a syntax element that indicates that a picture associated with the picture header NAL unit must be either an Intra Random Access Picture (IRAP) or a Gradual Decoder Refresh (GDR) picture; and means for determining, based on the syntax element, that the picture associated with the picture header NAL unit is an IRAP or a GDR picture, wherein: the picture header NAL unit contains syntax elements that apply to all slices of the picture associated with the picture header NAL unit, and the picture associated with the picture header NAL unit is in the set of encoded pictures.

Aspect 12I. The device of aspect 11I, wherein the syntax element is a first syntax element, the device further comprises: means for obtaining, based on the first syntax element indicating that the picture associated with the picture header NAL unit is an IRAP or a GDR picture, from the picture header NAL unit, a second syntax element that indicates whether the picture associated with the picture header NAL unit is a GDR picture.

Aspect 13I. The device of aspects 11I or 12I, wherein the device further comprising means for decoding the picture associated with the picture header NAL unit.

Aspect 14I. A device for encoding video data, the device comprising: means for generating encoded pictures for a set of pictures of the video data; and means for including a picture header Network Abstraction Layer (NAL) unit in a bitstream that comprises the encoded pictures, wherein the picture header NAL unit includes a syntax element that indicates that a picture associated with the picture header NAL unit must be either an Intra Random Access Picture (IRAP) or a Gradual Decoder Refresh (GDR) picture, wherein: the picture header NAL unit contains syntax elements that apply to all slices of the picture associated with the picture header NAL unit, and the picture associated with the picture header NAL unit is in the set of encoded pictures.

Aspect 15I. The device of aspect 14I, wherein the device further comprises means for including, based on the picture being an IRAP or a GDR picture, in the picture header NAL unit, a second syntax element that indicates whether the picture is a GDR picture.

Aspect 16I. A computer-readable storage medium having stored thereon instructions that, when executed, cause one or more processors to: obtain a bitstream that comprises a set of encoded pictures of the video data; and locate intra random access pictures (IRAP) or Gradual Decoder Refresh (GDR) pictures among the encoded pictures in the bitstream, wherein the instructions that cause the one or more processors to locate the IRAP or GDR pictures comprise instructions that, when executed, cause the one or more processors to: obtain, from a picture header Network Abstraction Layer (NAL) unit in the bitstream, a syntax element that indicates that a picture associated with the picture header NAL unit must be either an Intra Random Access Picture (IRAP) or a Gradual Decoder Refresh (GDR) picture; and determine, based on the syntax element, that the picture associated with the picture header NAL unit is an IRAP or a GDR picture, wherein: the picture header NAL unit contains syntax elements that apply to all slices of the picture associated with the picture header NAL unit, and the picture associated with the picture header NAL unit is in the set of encoded pictures.

Aspect 17I. The computer-readable storage medium of aspect 16I, wherein the syntax element is a first syntax element, the instructions further cause the one or more processors to: based on the first syntax element indicating that the picture associated with the picture header NAL unit is an IRAP or a GDR picture, obtain, from the picture header NAL unit, a second syntax element that indicates whether the picture associated with the picture header NAL unit is a GDR picture.

Aspect 18I. The computer-readable storage medium of aspects 16I or 17I, wherein the instructions, when executed, further cause the one or more processors to decode the picture associated with the picture header NAL unit.

Aspect 19I. A computer-readable storage medium having stored thereon instructions that, when executed, cause one or more processors to: generate encoded pictures for a set of pictures of the video data; and include a picture header Network Abstraction Layer (NAL) unit in a bitstream that comprises the encoded pictures, wherein the picture header NAL unit includes a syntax element that indicates that a picture associated with the picture header NAL unit must be either an Intra Random Access Picture (IRAP) or a Gradual Decoder Refresh (GDR) picture, wherein: the picture header NAL unit contains syntax elements that apply to all slices of the picture associated with the picture header NAL unit, and the picture associated with the picture header NAL unit is in the set of encoded pictures.

Aspect 20I. The computer-readable storage medium of aspect 19I, wherein the instructions, when executed, further cause the one or more processors to, based on the picture being an IRAP or a GDR picture, including, in the picture header NAL unit, a second syntax element that indicates whether the picture is a GDR picture.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

What is claimed is:

1. A method of processing video data, the method comprising:
obtaining a bitstream that comprises a set of encoded pictures of the video data; and
locating intra random access pictures (IRAP) or Gradual Decoder Refresh (GDR) pictures among the encoded pictures in the bitstream, wherein locating the IRAP or GDR pictures comprises:
obtaining, from a picture header Network Abstraction Layer (NAL) unit in the bitstream, a syntax element that indicates that a picture associated with the picture header NAL unit must be either an Intra Random Access Picture (IRAP) or a Gradual Decoder Refresh (GDR) picture; and
determining, based on the syntax element, that the picture associated with the picture header NAL unit is an IRAP or a GDR picture, wherein:
the picture header NAL unit contains syntax elements that apply to all slices of the picture associated with the picture header NAL unit, and
the picture associated with the picture header NAL unit is in the set of encoded pictures.

2. The method of claim 1, wherein the syntax element is a first syntax element, the method further comprising:
based on the first syntax element indicating that the picture associated with the picture header NAL unit is an IRAP or a GDR picture, obtaining, from the picture header NAL unit, a second syntax element that indicates whether the picture associated with the picture header NAL unit is a GDR picture.

3. The method of claim 1, further comprising decoding the picture associated with the picture header NAL unit.

4. A method of encoding video data, the method comprising:
generating encoded pictures for a set of pictures of the video data; and
including a picture header Network Abstraction Layer (NAL) unit in a bitstream that comprises the encoded pictures, wherein the picture header NAL unit includes a syntax element that indicates that a picture associated with the picture header NAL unit must be either an Intra Random Access Picture (IRAP) or a Gradual Decoder Refresh (GDR) picture, wherein:
the picture header NAL unit contains syntax elements that apply to all slices of the picture associated with the picture header NAL unit, and
the picture associated with the picture header NAL unit is in the set of pictures.

5. The method of claim 4, wherein the method further comprises, based on the picture being an IRAP or a GDR picture, including, in the picture header NAL unit, a second syntax element that indicates whether the picture is a GDR picture.

6. A device for processing video data, the device comprising:
a memory configured to store a bitstream that comprises a set of encoded pictures of the video data; and
one or more processors implemented in circuitry, the one or more processors configured to:
locate intra random access pictures (IRAP) or Gradual Decoder Refresh (GDR) pictures among the encoded pictures in the bitstream, wherein the one or more processors are configured such that, as part of locating the IRAP or GDR pictures, the one or more processors:
obtain, from a picture header Network Abstraction Layer (NAL) unit in the bitstream, a syntax element that indicates that a picture associated with the picture header NAL unit must be either an Intra Random Access Picture (IRAP) or a Gradual Decoder Refresh (GDR) picture; and
determine, based on the syntax element, that the picture associated with the picture header NAL unit is an IRAP or a GDR picture, wherein:
the picture header NAL unit contains syntax elements that apply to all slices of the picture associated with the picture header NAL unit, and
the picture associated with the picture header NAL unit is in the set of encoded pictures.

7. The device of claim 6, wherein the syntax element is a first syntax element and the one or more processors are further configured to:
based on the first syntax element indicating that the picture associated with the picture header NAL unit is an IRAP or a GDR picture, obtain, from the picture header NAL unit, a second syntax element that indicates whether the picture associated with the picture header NAL unit is a GDR picture.

8. The device of claim 6, wherein the one or more processors are further configured to decode the picture associated with the picture header NAL unit.

9. A device for encoding video data, the device comprising:
a memory configured to store the video data; and
one or more processors implemented in circuitry, the one or more processors configured to:
generate encoded pictures for a set of pictures of the video data; and
include a picture header Network Abstraction Layer (NAL) unit in a bitstream that comprises the encoded pictures, wherein the picture header NAL unit includes a syntax element that indicates that a picture associated with the picture header NAL unit must be either an Intra Random Access Picture (IRAP) or a Gradual Decoder Refresh (GDR) picture, wherein:
the picture header NAL unit contains syntax elements that apply to all slices of the picture associated with the picture header NAL unit, and
the picture associated with the picture header NAL unit is in the set of pictures.

10. The device of claim 9, wherein the one or more processors are further configured to, based on the picture being an IRAP or a GDR picture, include, in the picture header NAL unit, a second syntax element that indicates whether the picture is a GDR picture.

11. A device for processing video data, the device comprising:
means for obtaining a bitstream that comprises a set of encoded pictures of the video data; and
means for locating intra random access pictures (IRAP) or Gradual Decoder Refresh (GDR) pictures among the encoded pictures in the bitstream, wherein the means for locating the IRAP or GDR pictures comprises:
means for obtaining, from a picture header Network Abstraction Layer (NAL) unit in the bitstream, a syntax element that indicates that a picture associated with the picture header NAL unit must be either an Intra Random Access Picture (IRAP) or a Gradual Decoder Refresh (GDR) picture; and means for determining, based on the syntax element, that the picture associated with the picture header NAL unit is an IRAP or a GDR picture, wherein:
- the picture header NAL unit contains syntax elements that apply to all slices of the picture associated with the picture header NAL unit, and
- the picture associated with the picture header NAL unit is in the set of encoded pictures.

12. The device of claim 11, wherein the syntax element is a first syntax element and the device further comprises:
means for obtaining, based on the first syntax element indicating that the picture associated with the picture header NAL unit is an IRAP or a GDR picture, from the picture header NAL unit, a second syntax element that indicates whether the picture associated with the picture header NAL unit is a GDR picture.

13. The device of claim 11, wherein the device further comprising means for decoding the picture associated with the picture header NAL unit.

14. A device for encoding video data, the device comprising:
means for generating encoded pictures for a set of pictures of the video data; and
means for including a picture header Network Abstraction Layer (NAL) unit in a bitstream that comprises the encoded pictures, wherein the picture header NAL unit includes a syntax element that indicates that a picture associated with the picture header NAL unit must be either an Intra Random Access Picture (IRAP) or a Gradual Decoder Refresh (GDR) picture, wherein:
- the picture header NAL unit contains syntax elements that apply to all slices of the picture associated with the picture header NAL unit, and
- the picture associated with the picture header NAL unit is in the set of pictures.

15. The device of claim 14, wherein the device further comprises means for including, based on the picture being an IRAP or a GDR picture, in the picture header NAL unit, a second syntax element that indicates whether the picture is a GDR picture.

16. A non-transitory computer-readable storage medium having stored thereon instructions that, when executed, cause one or more processors to:
obtain a bitstream that comprises a set of encoded pictures of video data; and
locate intra random access pictures (IRAP) or Gradual Decoder Refresh (GDR) pictures among the encoded pictures in the bitstream, wherein the instructions that cause the one or more processors to locate the IRAP or GDR pictures comprise instructions that, when executed, cause the one or more processors to:
- obtain, from a picture header Network Abstraction Layer (NAL) unit in the bitstream, a syntax element that indicates that a picture associated with the picture header NAL unit must be either an Intra Random Access Picture (IRAP) or a Gradual Decoder Refresh (GDR) picture; and
- determine, based on the syntax element, that the picture associated with the picture header NAL unit is an IRAP or a GDR picture, wherein:
  - the picture header NAL unit contains syntax elements that apply to all slices of the picture associated with the picture header NAL unit, and
  - the picture associated with the picture header NAL unit is in the set of encoded pictures.

17. The non-transitory computer-readable storage medium of claim 16, wherein the syntax element is a first syntax element and the instructions further cause the one or more processors to:
based on the first syntax element indicating that the picture associated with the picture header NAL unit is an IRAP or a GDR picture, obtain, from the picture header NAL unit, a second syntax element that indicates whether the picture associated with the picture header NAL unit is a GDR picture.

18. The non-transitory computer-readable storage medium of claim 16, wherein the instructions, when executed, further cause the one or more processors to decode the picture associated with the picture header NAL unit.

19. A non-transitory computer-readable storage medium having stored thereon instructions that, when executed, cause one or more processors to:
generate encoded pictures for a set of pictures of video data; and
include a picture header Network Abstraction Layer (NAL) unit in a bitstream that comprises the encoded pictures, wherein the picture header NAL unit includes a syntax element that indicates that a picture associated with the picture header NAL unit must be either an Intra Random Access Picture (IRAP) or a Gradual Decoder Refresh (GDR) picture, wherein:
- the picture header NAL unit contains syntax elements that apply to all slices of the picture associated with the picture header NAL unit, and
- the picture associated with the picture header NAL unit is in the set of pictures.

20. The non-transitory computer-readable storage medium of claim 19, wherein the instructions, when executed, further cause the one or more processors to, based on the picture being an IRAP or a GDR picture, including, in the picture header NAL unit, a second syntax element that indicates whether the picture is a GDR picture.

* * * * *